US010891721B2

(12) United States Patent
Kim et al.

(10) Patent No.: US 10,891,721 B2
(45) Date of Patent: Jan. 12, 2021

(54) METHOD FOR RECONSTRUCTING HYPERSPECTRAL IMAGE USING PRISM AND SYSTEM THEREFOR

(71) Applicant: Korea Advanced Institute of Science and Technology, Daejeon (KR)

(72) Inventors: Min Hyuk Kim, Daejeon (KR); Seung-Hwan Baek, Daejeon (KR); Incheol Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 134 days.

(21) Appl. No.: 16/140,347

(22) Filed: Sep. 24, 2018

(65) Prior Publication Data
US 2019/0096044 A1    Mar. 28, 2019

(30) Foreign Application Priority Data

Sep. 25, 2017   (KR) .................. 10-2017-0123471
Mar. 20, 2018   (KR) .................. 10-2018-0031807
Jul. 4, 2018    (KR) .................. 10-2018-0077646

(51) Int. Cl.
*G06T 5/00*       (2006.01)
*G02B 27/10*      (2006.01)
(Continued)

(52) U.S. Cl.
CPC .............. *G06T 5/006* (2013.01); *G01J 3/14* (2013.01); *G01J 3/28* (2013.01); *G01J 3/2823* (2013.01); *G02B 27/1013* (2013.01); *H04N 9/045* (2013.01); *H04N 17/002* (2013.01); *G01J 2003/284* (2013.01); *G01J 2003/2826* (2013.01)

(58) Field of Classification Search
CPC ..... G06T 5/006; G01J 3/14; G01J 3/28; G01J 3/2823; G01J 3/36; G01J 3/0205; G01J 3/027; G01J 3/18; G01J 3/0208; G01J 3/0248; G01J 3/2803; G01J 3/0229; G01J 3/0275; G02B 27/1013; G02B 5/1814; G02B 5/1842; G02B 5/02; G02B 26/02; G02B 26/023; G02B 27/14; G02B 27/144; H04N 9/045; H04N 17/002; H04N 5/332; H04N 5/247; H04N 5/254; H04N 5/2258;
(Continued)

(56) References Cited

U.S. PATENT DOCUMENTS 8,081,244 B2 * 12/2011 Golub .................. G01J 3/2803
348/294
9,013,691 B2 * 4/2015 Golub .................. H04N 9/045
356/326

(Continued)

OTHER PUBLICATIONS

Zhang, Zhengyou; "A Flexible New Technique for Camera Calibration"; IEEE Transactions on Pattern Analysis and Machine Intelligence; vol. 22; Dec. 2000; 22 pages.

*Primary Examiner* — Michael S Osinski
(74) *Attorney, Agent, or Firm* — BakerHostetler

(57) ABSTRACT

A method for reconstructing a hyperspectral image and a system therefor are provided. The method includes obtaining a dispersion model for dispersion created by a prism included in a camera, the prism including no coded aperture, and reconstructing a hyperspectral image corresponding to a captured image based on the dispersion model.

10 Claims, 18 Drawing Sheets

(51) Int. Cl.
*G01J 3/28* (2006.01)
*H04N 17/00* (2006.01)
*H04N 9/04* (2006.01)
*G01J 3/14* (2006.01)

(58) Field of Classification Search
CPC .......... H04N 5/23232; H04N 5/23238; H04N 5/23296; H04N 5/238
See application file for complete search history.

(56) References Cited

U.S. PATENT DOCUMENTS

| | | | | |
|---|---|---|---|---|
| 9,426,383 | B1* | 8/2016 | Hinkel | H04N 5/238 |
| 9,581,496 | B2* | 2/2017 | Golub | H04N 5/23296 |
| 9,823,126 | B2* | 11/2017 | Golub | G01J 3/0205 |
| 10,184,830 | B2* | 1/2019 | Golub | G01J 3/0205 |
| 10,250,871 | B2* | 4/2019 | Ciurea | G06T 5/006 |
| 10,638,062 | B1* | 4/2020 | Yoshimori | H04N 5/341 |
| 2003/0133109 | A1* | 7/2003 | Murguia | G01J 3/14 356/326 |
| 2004/0141213 | A1* | 7/2004 | Kleiman | G01J 3/2823 358/474 |
| 2009/0128649 | A1* | 5/2009 | Osorio | H04N 1/6033 348/222.1 |
| 2010/0013979 | A1* | 1/2010 | Golub | G01J 3/2803 348/340 |
| 2011/0176029 | A1* | 7/2011 | Boydston | H04N 1/46 348/223.1 |
| 2011/0206291 | A1* | 8/2011 | Kashani | A61B 5/14555 382/255 |
| 2012/0176625 | A1* | 7/2012 | Huntley | G01B 11/2441 356/511 |
| 2013/0194481 | A1* | 8/2013 | Golub | G02B 5/1842 348/336 |
| 2013/0256518 | A1* | 10/2013 | George | G02B 26/02 250/237 R |
| 2015/0377778 | A1* | 12/2015 | Kimura | G01N 22/00 702/189 |
| 2016/0097713 | A1* | 4/2016 | Kester | G01M 3/38 356/51 |
| 2016/0313181 | A1* | 10/2016 | Golub | G01J 3/027 |
| 2016/0377557 | A1* | 12/2016 | Kimura | G01N 22/00 324/638 |
| 2017/0079605 | A1* | 3/2017 | Proksa | G01T 1/2985 |
| 2017/0199120 | A1* | 7/2017 | Liu | A61B 90/37 |
| 2017/0244960 | A1* | 8/2017 | Ciurea | H04N 5/247 |
| 2018/0160510 | A1* | 6/2018 | Ramer | G01J 3/027 |
| 2019/0236886 | A1* | 8/2019 | Dorier | G07D 7/1205 |
| 2019/0320126 | A1* | 10/2019 | Akashi | H04N 9/07 |

* cited by examiner

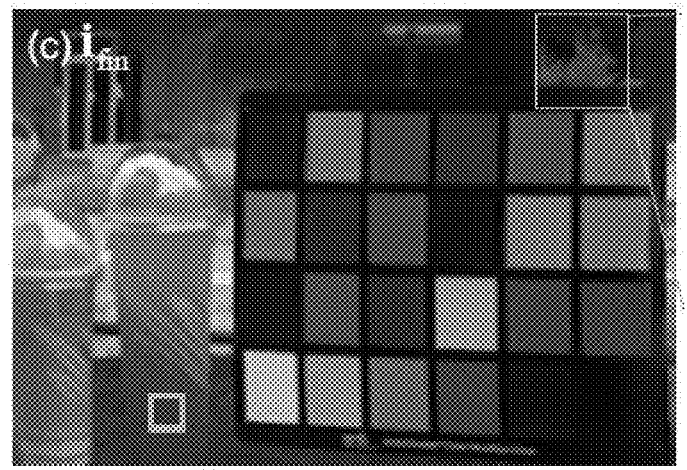
FIG. 9C
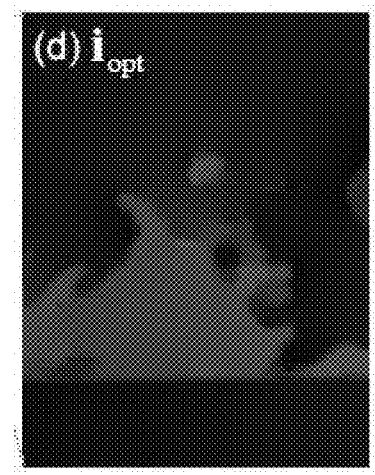 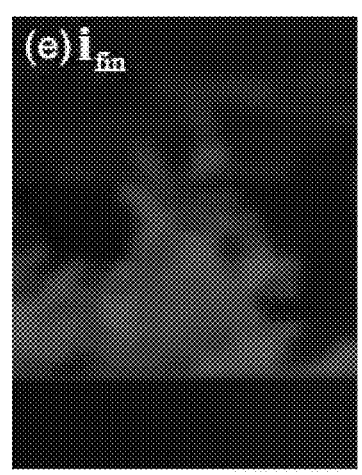
FIG. 9D FIG. 9E

METHOD FOR RECONSTRUCTING HYPERSPECTRAL IMAGE USING PRISM AND SYSTEM THEREFOR

CROSS-REFERENCE TO RELATED APPLICATIONS

A claim for priority under 35 U.S.C. § 119 is made to Korean Patent Application No. 10-2017-0123471 filed on Sep. 25, 2017, and Korean Patent Application No. 10-2018-0031807 filed on Mar. 20, 2018, and Korean Patent Application No. 10-2018-0077646 filed on Jul. 4, 2018, in the Korean Intellectual Property Office, the entire contents of which are hereby incorporated by reference.

BACKGROUND

Embodiments of the inventive concept described herein relate to technologies of reconstructing hyperspectral images, and more particularly, relate to a method for reconstructing hyperspectral images using only a camera and a prism and a system therefor.

Hyperspectral imaging (or hyperspectral images) has been researched extensively in the last decade. Existing methods may be categorized into three different groups: spectral scanning, computed tomography imaging, and compressive hyperspectral imaging.

Describing the spectral scanning, the most straightforward approach in hyperspectral imaging is to isolate measurements using different bandpass or liquid crystal tunable filters, scanning the entire spectrum to form the final image. In addition, using dispersive optics such as a prism or a diffraction grating, scanning-based approaches may image each wavelength in isolation through a slit, using whiskbroom or pushbroom scanners. While scanning yields high spatial resolution, the spectral resolution of this approach is limited by the number of filters used.

Describing compressive imaging, coded aperture snapshot spectral imaging (CASSI) was developed in an effort to overcome the limitations of spectral scanning systems. A coded aperture is placed in front of or behind a prism (or a diffraction grating) via collimation in the optical path of the imaging system. The coded aperture is used to encode spectral signatures, which are later used to reconstruct the compressive input into a complete hyperspectral image. Multiple sampling techniques have been introduced to further improve accuracy using a micro-translation stage or a kaleidoscope. Other techniques introduced learning-based solutions for enhancing spatial and spectral resolution of reconstructed images. Traditional compressive imaging systems are large and expensive due to additional elements such as collimating optics and coded masks, making them bulky and hard to handle in practice.

Furthermore, recently, a low-cost spectral imaging method, a so-called prism-mask multispectral video imaging system (PMVIS), was proposed. This method isolates spectral dispersion by placing a large mask of pinholes in front of a prism, thus creating a simple setup with affordable elements. However, such a large mask must be carefully installed in front of a large black box, at a relatively large distance from the prism, in order to properly isolate dispersed regions. This results in a large form factor, again hindering usability. Moreover, the number of holes in the mask determines the spatial resolution of the image, which is much lower than the image sensor resolution (less than 10%), while overall light throughput is reduced significantly. Furthermore, another technique proposed a simple system based on a cheap, off-the-shelf diffraction grating. The system was designed to recover the spectral signature of visible light sources, although it may not reconstruct the full hyperspectral image.

Describing the computed tomography imaging, computed tomography imaging spectrometry (CTIS) uses a diffraction grating to split incident light rays into a number of spectral projections on an image plane. Since multiple sub-images need to be captured with a single sensor, the effective spatial resolution of the reconstructed images is less than 10% of the original sensor resolution. Another technique introduced a cheaper solution for hyperspectral imaging by applying CTIS to a conventional DSLR camera. However, the system suffers from a similar loss of spatial resolution.

Snapshot image mapping spectrometry employs a micromirror array as an image mapper to split incoming rays into strips, followed by dispersion and imaging with a prism and lens array. The spectral intensity of a scene point is directly measured by a single pixel on the camera sensor similar to PMVIS. However, the image mapping sacrifices spatial resolution, while the system setup requires a prism, a mirror, and a lens array, making it complex.

Another technique employed reflectors with color filters by exploiting multiple reflections through the filters. However, the system is limited to flat objects, and the spatial resolution is reduced because multiple reflections of the objects must be captured in a single image. In order to obtain high-resolution spectral images, hybrid imaging systems have been proposed by employing an additional high-resolution, trichromatic imaging device with red, green, and blue (RGB) filters. However, it increases the size of the system, and introduces calibration issues between the heterogeneous systems.

Describing a method of estimating spectrum from RGB, several works approximate spectral information from a single RGB input. The technique of one example proposed a regression-based method that approximates a spectrum as a linear combination of basis functions of the standard XYZ matching functions. The estimation algorithm relies on piecewise smoothness constraints along the spectrum. The technique of another example proposed a data-driven approach that learns spectral distributions of the reflectance of objects. While regressing the spectral information from an RGB input, the corresponding techniques use the reflectance model, trained with a hyperspectral image dataset, as a prior for optimization. However, these regression-based approaches may only approximate the actual spectra. The spectral accuracy of these methods is limited by the metameristic input of the RGB camera, for which filter bandwidth is about 100 nm.

SUMMARY

Embodiments of the inventive concept provide a method for reconstructing a hyperspectral image using only a camera and a prism and a system therefor.

According to an aspect of an embodiment, a method for reconstructing a hyperspectral image may include obtaining a dispersion model for dispersion created by a prism included in a camera, the prism including no coded aperture and reconstructing a hyperspectral image corresponding to a captured image based on the dispersion model.

The method may further include aligning an input dispersed captured image to obtain edge information without dispersion and estimating spectral information based on the obtained edge information and the dispersion model. The reconstructing of the hyperspectral image may include reconstructing the hyperspectral image corresponding to the captured image based on the estimated spectral information.

The obtaining of the dispersion model may include generating a refraction function for each wavelength, the refraction function predicting each pixel's wavelength-dependent refractive shift and obtaining the dispersion model for the magnitude and direction of dispersion in the captured image based on the generated refraction function.

The generating of the refraction function may include generating the refraction function describing a relation between a first position at which a direct ray reaches a sensor of the camera and a second position at which the direct ray is projected on the sensor by refraction through the prism, with respect to each pixel.

The obtaining of the dispersion model may include selecting a reference wavelength and obtaining the first position corresponding to a reference position and depth at which the direct ray is projected on the sensor in response to the reference wavelength using the refraction function, computing an inverse refraction function mapping from the first position to the second position, for predetermined wavelengths, and obtaining the dispersion model which encodes the magnitude and direction of dispersion of the captured image using the first position, corresponding to the reference position and depth, and the inverse refraction function.

The method may further include calibrating a radiometric response of the camera and the dispersion model. The reconstructing of the hyperspectral image may include reconstructing the hyperspectral image corresponding to the captured image based on the calibrated radiometric response and the calibrated dispersion model.

The obtaining of the edge information may include computing a difference between unnormalized gradient values of adjacent spectral channels in the captured image, performing spatial alignment between spectral channels, projecting an aligned spectral image onto RGB channels via a response function of the camera, and obtaining the edge information using an edge detector.

According to another aspect of an embodiment, a method for reconstructing a hyperspectral image may include aligning an input dispersed captured image through a prism included in a camera, the prism including no coded aperture, and obtaining edge information without dispersion, estimating spectral information based on the obtained edge information and a dispersion model for dispersion created by the prism, and reconstructing a hyperspectral image corresponding to the captured image based on the estimated spectral information.

The captured image may be an image captured without passing through the coded aperture.

According to another aspect of an embodiment, a camera device may include a first obtaining unit configured to obtain a dispersion model for dispersion created by a prism included in a camera, the prism including no coded aperture and a reconstruction unit configured to reconstruct a hyperspectral image corresponding to a captured image based on the dispersion model.

The camera device may further include a second obtaining unit configured to align an input dispersed captured image to obtain edge information without dispersion and an estimation unit configured to estimate spectral information based on the obtained edge information and the dispersion model. The reconstruction unit may be configured to reconstruct the hyperspectral image corresponding to the captured image based on the estimated spectral information.

According to another aspect of an embodiment, a system for reconstructing a hyperspectral image may include a prism included in a camera and a camera device. The camera device may be configured to obtain a dispersion model for dispersion created by the prism including no coded aperture and reconstruct a hyperspectral image corresponding to a captured image based on the dispersion model.

According to another aspect of an embodiment, a method for reconstructing a hyperspectral image may include obtaining a dispersion model for dispersion created by a prism included in a camera, based on a refraction function for a relation between a direct ray and refraction of the prism and reconstructing a hyperspectral image corresponding to a captured image based on the dispersion model.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 9C is a drawing illustrating final reconstructed sRGB image, and FIGS. 9D and 9E are drawings illustrating comparison between the initial reconstruction $i_{opt}$ and after detail enhancement $i_{fin}(e)$;

DETAILED DESCRIPTION

Figure 1A:
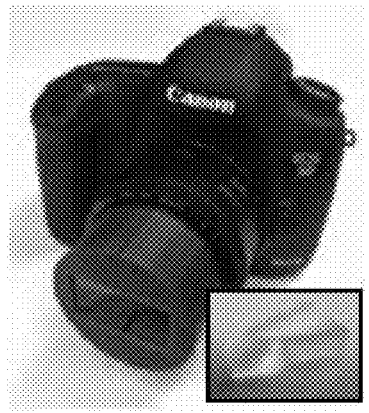
FIGS. 1A, 1B, 1C, 1D and 1E are drawings illustrating a single-shot spectral imaging method capable of capturing hyperspectral images using a conventional DSLR camera.

Hereinafter, a description will be given in detail of embodiments with reference to the accompanying drawings. However, the inventive concept is restricted or limited to embodiments of the inventive concept. Further, like reference numerals shown in each drawing indicates like members.

Hyperspectral imaging has wide applicability in many fields such as physically-accurate material appearance, automatic segmentation and matching, material classification, or material inspection for mining and geology. However, hyperspectral imaging systems are still very expensive, with starting prices falling in the range of $25,000-$100,000. These systems require specialized hardware such as collimating optics, or a lithographic coded aperture with microscale patterns and a diffraction grating, in addition to professional engineering skills for handling and assembling such hardware. In general, these systems are built for specific purposes such as aerial remote sensing or military application programs. As such, they are not affordable nor practical for ordinary users.

Traditional scanning systems isolate measurements for each wavelength using filters, which result in a slow process (speed). Moreover, the spectral resolution is limited by the type and number of filters used. Hyperspectral imaging techniques such as coded aperture snapshot spectral imaging (CASSI) employ a coded aperture as an essential element to capture spectral information. Subsequent spectral reconstruction of the image relies on a spatially-invariant dispersion model, for which collimating optical setups are required. This alters significantly the form factor of the system.

To overcome these limitations, an embodiment of the inventive concept, illustrated in FIGS. 1A-1E may present a novel single-shot technique for hyperspectral imaging, which requires a simple glass prism placed in front of a conventional DSLR camera lens. An embodiment of the inventive concept may thus avoid expensive or specialized hardware, requires no advanced skills, and has a minimal impact on the form factor, allowing general users to freely capture hyperspectral information.

Figure 1B:
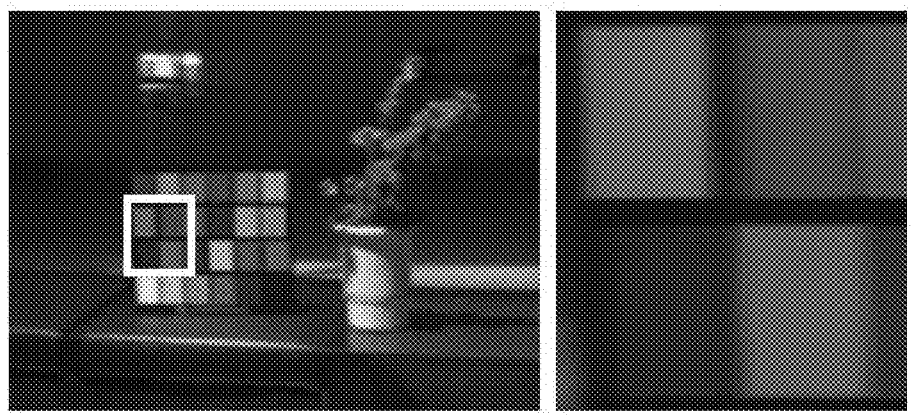
Figure 1C:
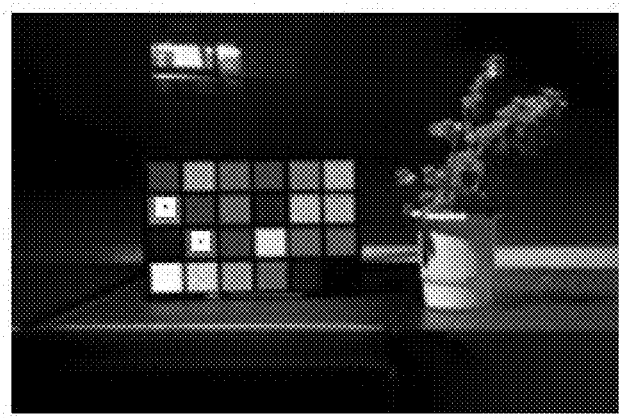
Figures 1D, 1E:
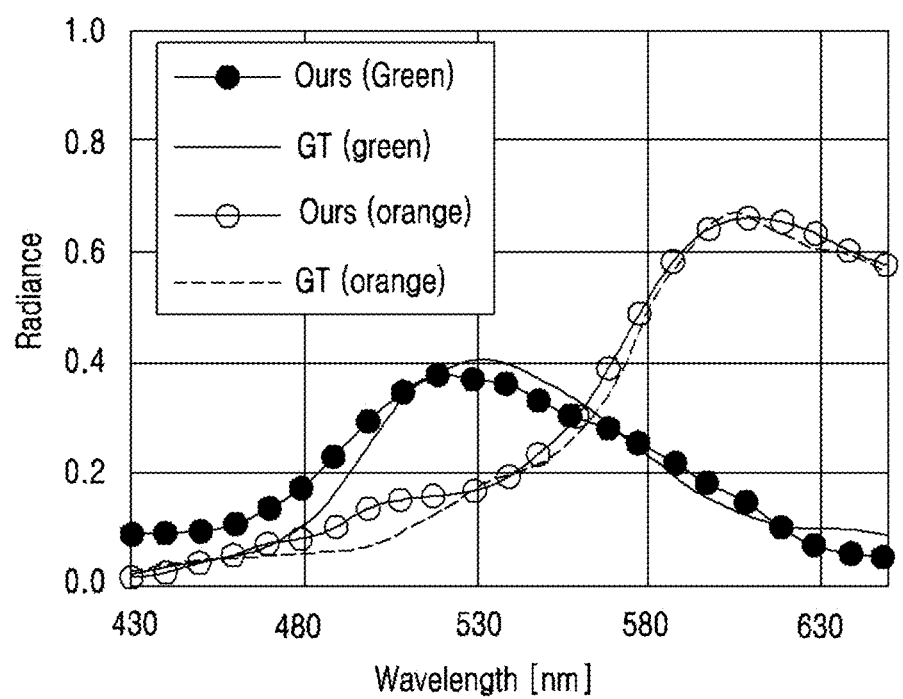
Figure 2A:
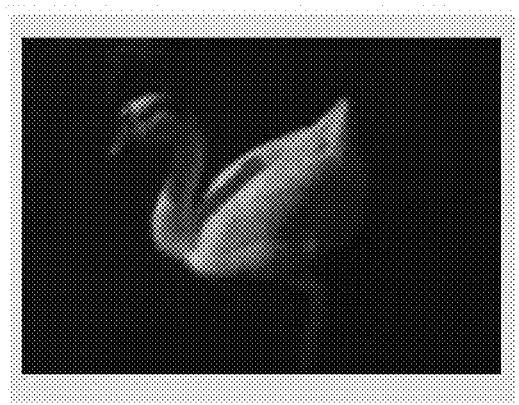
FIGS. 2A, 2B, 2C and 2D are drawings illustrating an overview of a reconstruction algorithm according to an embodiment of the inventive concept.
Figure 2B:
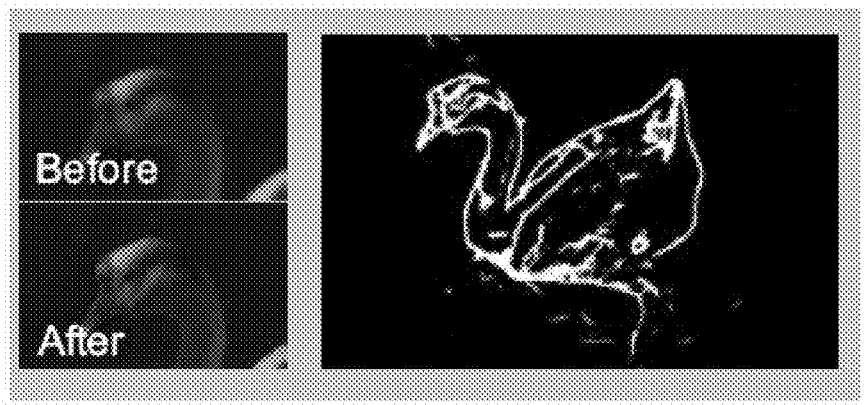
Figure 2C:
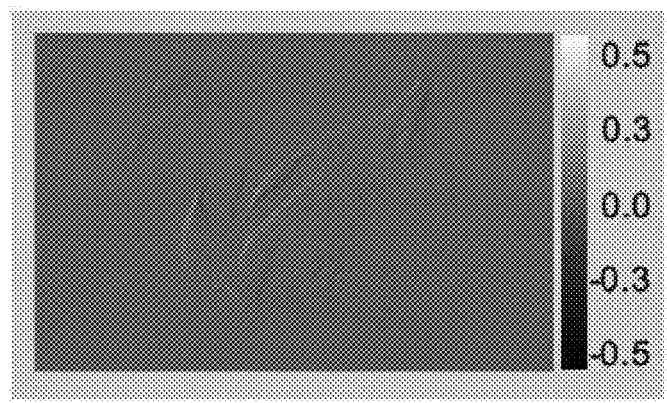
Figure 2D:
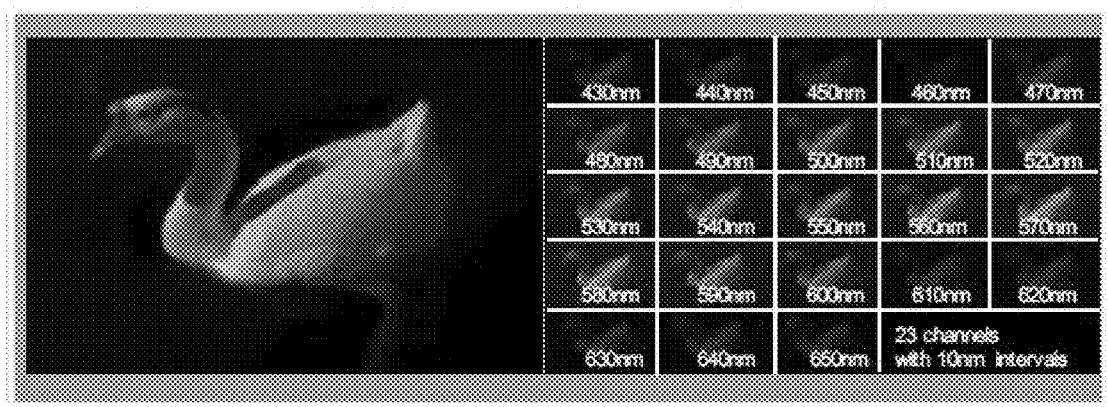

Using a simple prism presents two main technical challenges. First, existing spatially-invariant dispersion models may not be applied to a system according to an embodiment of the inventive concept. This is due to the absence of collimating optics and the resulting of wavelength-dependent, nonlinear refractive distortion created by the prism, as shown in FIG. 1B. Second, since setup according to an embodiment of the inventive concept includes no coded aperture mask, available spectral cues are sparsely limited as dispersion over edges. In addition, since setup according to an embodiment of the inventive concept captures a scene in its full resolution without using a diffraction grating, spectral cues are also sparse in a single direction. The reconstruction algorithm according to an embodiment of the inventive concept should be able to reconstruct the full spectral information of a scene from sparse dispersion over edges, without relying on spectral signatures from a coded aperture.

Embodiments of the inventive concept may provide a method and system capable of reconstructing a hyperspectral image using only a camera and a prism, thus enhancing portability and reducing the cost of configuring the system.

To this end, first, an embodiment of the inventive concept may introduce a novel image formation model that predicts the perspective projection of dispersion, yielding the dispersion direction and magnitude of each wavelength at every pixel. Second, an embodiment of the inventive concept may propose a novel calibration method to estimate the spatially-varying dispersion of the prism, given the absence of collimating optics in the setup. Last, an embodiment of the inventive concept may provide a novel reconstruction algorithm leveraging dispersion over edges.

The reconstruction algorithm according to an embodiment of the inventive concept may be include, as shown in FIGS. 2A-2D, three main steps: edge restoration, gradient estimation, and spectral reconstruction.

A description will be given in detail of such a method and system according to an embodiment of the inventive concept.

1. Image Formation Model

A hyperspectral image may be described as a three-dimensional (3D) cube $$I(p,\lambda) \in \mathfrak{R}^{X \times Y \times 79}$$

Herein, X, Y and $\Lambda$ may represent the horizontal, vertical and spectral axes, respectively, p may represent a sensor pixel (x,y), and $\lambda$ may represent wavelength.

Different from traditional hyperspectral imagers, an embodiment of the inventive concept may use a conventional RGB camera, plus a prism in front of the lens. Thus, spectral image formulation according to an embodiment of the inventive concept may be different from classic compressive imaging architectures.

In other words, since the prism disperses incident rays of light, resulting in shifts of the spectral cube I along $\lambda$, an embodiment of the inventive concept may describe the image formation model as Equation 1 below.

$$J(p,c) = \int \Omega(c,\lambda) I(\Phi_\lambda(p),\lambda) d\lambda \qquad \text{[Equation 1]}$$

Herein, J(p, c) may be the linear RGB image captured by the camera (with c∈{R, G, B}), $\Omega(c, \lambda)$ may be the transmission function encoding the camera response for channel c and wavelength $\lambda$, and $\Phi_\lambda(p)$ may represent the spatially-varying, nonlinear dispersion caused by the prism, modeled as a shift operator at each pixel p for each wavelength $\lambda$.

An embodiment of the inventive concept may reformulate this model in a discrete form as $J(p, c) = \Sigma_\lambda \Omega(c, \lambda) I(\Phi_\lambda(p),\lambda)$, which in matrix-vector form like Equation 2 below.

$$j = \Omega \Phi i \qquad \text{[Equation 2]}$$

Herein, $j \in \mathfrak{R}^{XY3 \times 1}$ and $i \in \mathfrak{R}^{XY\Lambda \times 1}$ may be vectorized linear RGB and hyperspectral images, respectively, and $\Omega$ may be an operator converting spectral information to RGB. $\Phi \in \mathfrak{R}^{XY\Lambda \times XY\Lambda}$ may represent a matrix describing the direction and magnitude of dispersion per pixel.

Figure 3A:
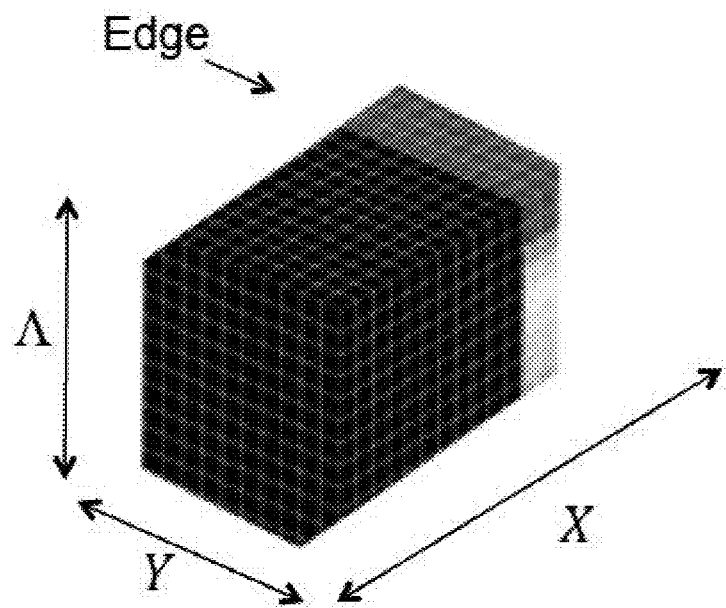
FIGS. 3A, 3B and 3C are drawings illustrating a diagram of a spectral data cub in each step.
Figure 3B:
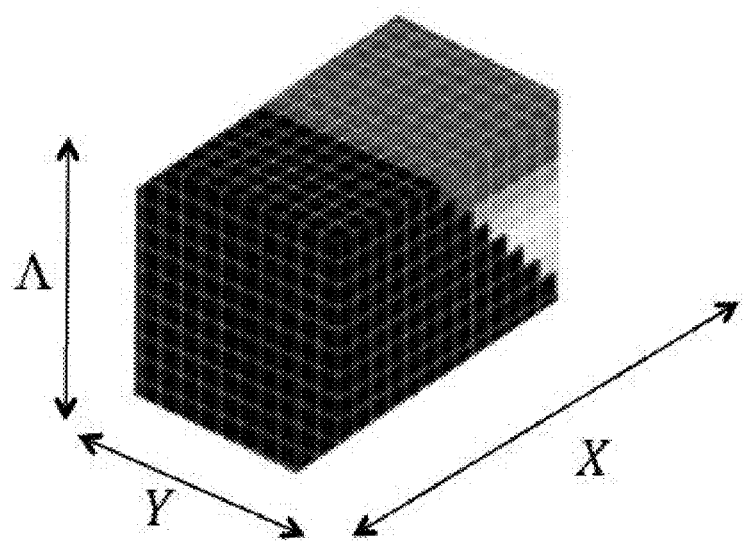
Figure 3C:
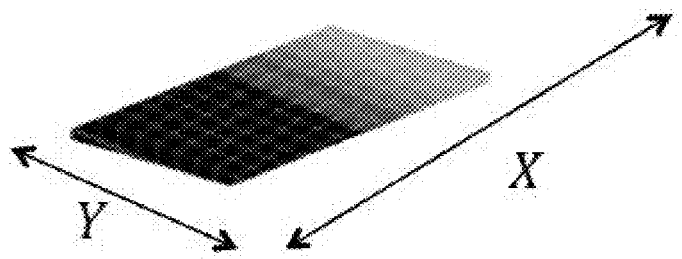

FIGS. 3A-3C show a diagram of the spectral data cube at each step. FIG. 3A shows the 3D spectral data cub i: the original data cube consists of two spatial axes X and Y and one spectral axis. FIG. 3B shows the dispersed spectral $\Phi_i$: the prism shifts the spectral information along X. FIG. 3C shows the projected dispersion $\Omega\Phi_i$: the dispersed spectrum may then be integrated along the spectral axis, following the camera response functions. The spectral information of the original data cube may be embedded around edges in the projected dispersion. The method according to an embodiment of the inventive concept may take the projected information with dispersion as input, and may reconstruct the original spectral data cube by analyzing the dispersion around edges.

Hereinafter, an embodiment of the inventive concept will first derive the dispersion function $\Phi_\lambda(p)$ in Equation 1 above and will then describe the reconstruction method.

2. Spatially-Varying Dispersion

Figure 4:
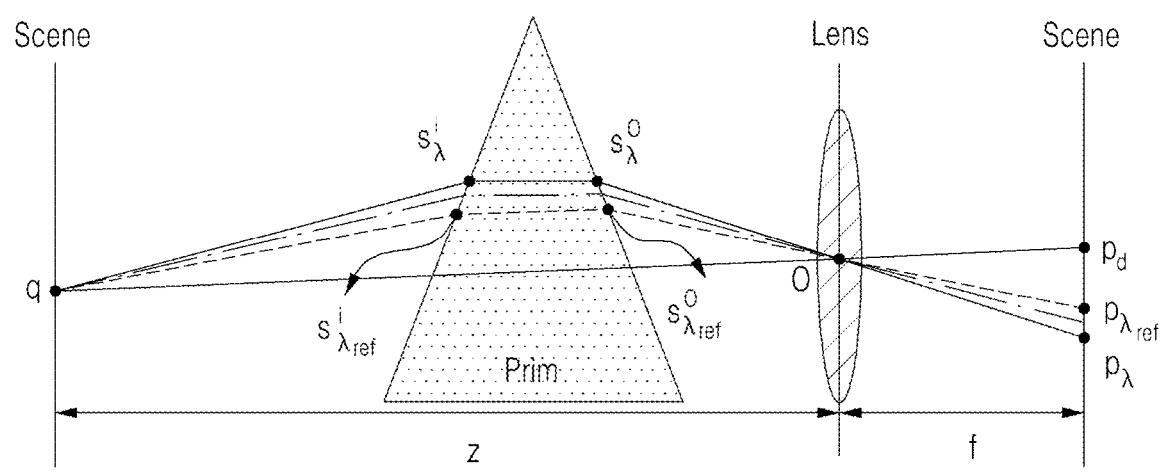
FIG. 4 is a drawing schematically illustrating a hyperspectral capture model based on a prism.

FIG. 4 presents a schematic view of the prism-based hyperspectral capture model.

As shown in FIG. 4, without a prism, a ray of light may travel undisturbed from scene point q, and may reach the sensor at point $p_d$ through the optical center o of the camera lens. When the prism is placed in front of the lens, q may instead project through o to new wavelength-dependent positions $p_\lambda$, on the sensor, after two refractions at $s_\lambda^i$ and $s_\lambda^o$.

Herein, an embodiment of the inventive concept may be to obtain the dispersion function $\Phi_\lambda$ (written in Equation 1 above), which models the dispersion created by the prism placed in front of the lens. Traditional compressive hyperspectral imagers may employ complex collimating optics, which may allow to model dispersion as a simple linear translation. However, since an embodiment of the inventive concept does not rely on optical collimation in the compact setup according to the embodiment of the inventive concept, dispersion in the imaging model according to the embodiment of the inventive concept may become both spatially-varying and nonlinear.

To derive $\Phi_\lambda$, an embodiment of the inventive concept may follow a two-stage approach.

First, an embodiment of the inventive concept may develop a refraction function $\Psi_\lambda$, for each wavelength, which predicts each pixel's wavelength-dependent refractive shift. In other words, an embodiment of the inventive concept may describe the relation between the direct-ray point $p_d$ and $p_\lambda$ at the sensor. Second, an embodiment of the inventive concept may find per-pixel correspondences for all wavelengths in the captured image, resulting in the dispersion function $\Phi_\lambda$.

The single-shot approach according to an embodiment of the inventive concept may fail to require a direct capture without a prism, so $p_d$ is never imaged. However, an embodiment of the inventive concept will rely on $p_d$ in derivations according to the embodiment of the inventive concept, and eliminate this dependency when developing the final dispersion model. To explicitly take depth z into account, an embodiment of the inventive concept may redefine points in 3D space $\Re^3$, so that a pixel (x,y) on the sensor is represented as a 3D-vector $[x,y, -f]^T$.

Herein, f may represent focal length.

2.1 Refraction Model

An embodiment of the inventive concept may first seek a refraction model $\Psi$ in matrix form, describing the refractive shift function $\Psi_\lambda$ for every pixel as the relation between points $p_d$ and $p_\lambda$, at the sensor, for which the embodiment of the inventive concept will describe both refracted and direct rays through o using such a process. The refraction model according to an embodiment of the inventive concept may concern itself with refracted rays through o, which is different from the traditional light-through-a-prism model commonly used to illustrate dispersion.

Refracted Ray

From $p_\lambda$, an embodiment of the inventive concept may obtain the intersection points $s_\lambda^o$ and $s_\lambda^i$ with simple geometric optics, and may use Snell's law at the surface of the prism. From $s_\lambda^i=[s_x, s_y, s_z]^T$, using again Snell's law, an embodiment of the inventive concept may obtain the refraction direction vector $\overline{s_\lambda^i q}=[v_x, v_y, v_z]^T$. An embodiment of the inventive concept may then formulate a scene point q as a function of depth z and wavelength λ, like Equation 3 below.

$$q = \theta_\lambda(z; p_\lambda) \equiv \left[s_x + \frac{z - s_z}{v_z}v_x, s_y + \frac{z - s_z}{v_z}v_y, z\right]^T \quad \text{[Equation 3]}$$

Direct Ray vs. Refracted Ray

An embodiment of the inventive concept may now formulate the depth-dependent relation between points $p_d$ and $p_\lambda$ by simple perspective projection, as the function $\Psi_\lambda$, describing the refractive shift like Equation 4 below.

$$p_d = \Psi_\lambda(z; p_\lambda) \equiv -\frac{f}{z}\theta_\lambda(z; p_\lambda) \quad \text{[Equation 4]}$$

This function $\Psi_\lambda$ will enable an embodiment of the inventive concept to derive the final dispersion model $\Phi$ according to the embodiment of the inventive concept as a vector field, which will in turn allow the embodiment of the inventive concept to establish per-pixel correspondences along the visible spectrum in the captured image.

2.2. Dispersion Model

An embodiment of the inventive concept may seek a dispersion model $\Phi$ in matrix form, describing the dispersion function $\Phi_\lambda$ for every pixel as the relation between the points $p\lambda_{ref}$ and $p_\lambda$, in terms of the magnitude and direction of dispersion in the captured image. For this, an embodiment of the inventive concept may leverage the refraction function $\Psi_\lambda$, relating $p_d$ to the captured $p_\lambda$.

First, an embodiment of the inventive concept may select a reference wavelength $\lambda_{ref}$=550 nm for measurements. Using the refraction function $\Psi_{\lambda_{ref}}$, an embodiment of the inventive concept may obtain pixel $p_d$ corresponding to the reference pixel $p_{\lambda_{ref}}$, as a function of depth z: $p_d=\Psi_{\lambda_{ref}}(z; p_{\lambda_{ref}})$.

Figure 5:
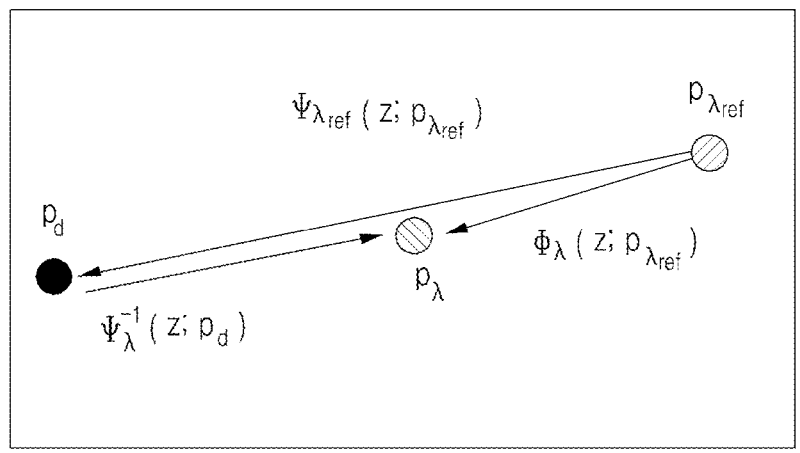
FIG. 5 is a drawing illustrating a process of obtaining a dispersion function.

Then, for any other target wavelength λ, an embodiment of the inventive concept may calculate the inverse refraction function $\Psi_\lambda^{-1}(p_\lambda=\Psi_\lambda^{-1}(z;p_d))$ mapping from $p_d$ to $p_\lambda$. FIG. 5 illustrates the process for the above-mentioned dispersion model.

Finally, an embodiment of the inventive concept may obtain the dispersion function $\Phi_\lambda$, which encodes the magnitude and direction of dispersion, and may find any pixel $p_\lambda$ from the reference-wavelength pixel $p_{\lambda_{ref}}$ as a function of depth z and may represent the pixel $p_\lambda$ as Equation 5 below.

$$p_\lambda=\Phi_\lambda(z;p_{\lambda_{ref}})\equiv\Psi_\lambda^{-1}(z;\Psi_{\lambda_{ref}}(z;p_{\lambda_{ref}})) \quad \text{[Equation 5]}$$

2.3 Analysis

Figure 6A:
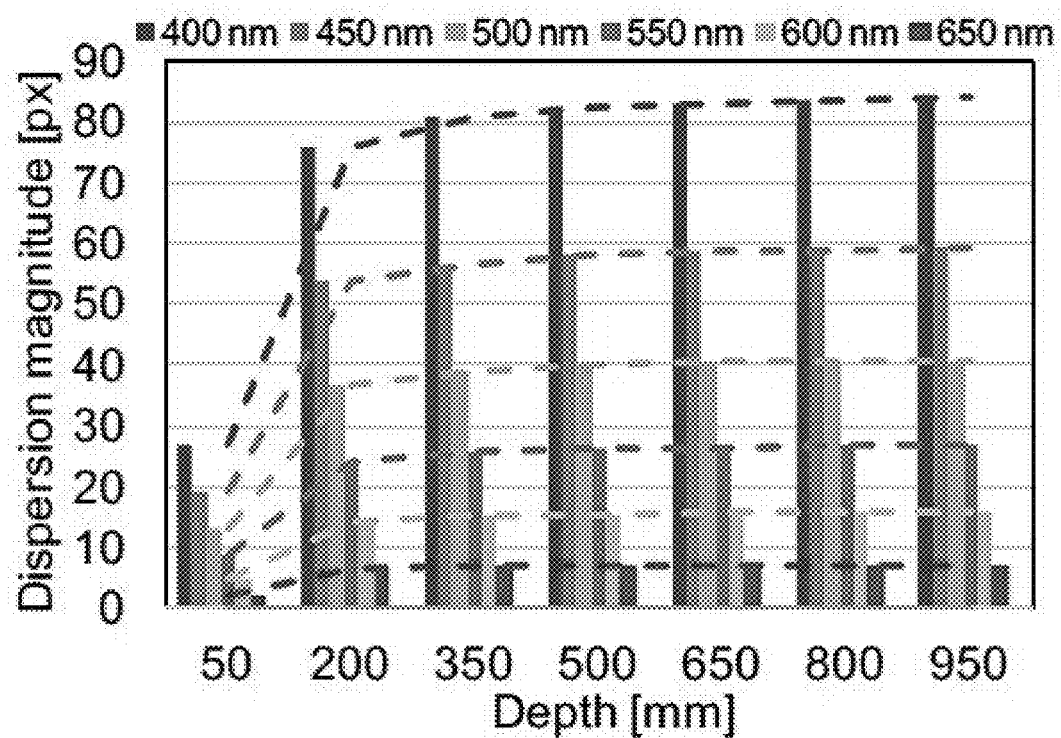
FIG. 6A is a drawing illustrating an example of per-wavelength changes in dispersion magnitude with varying depth.
Figure 6B:
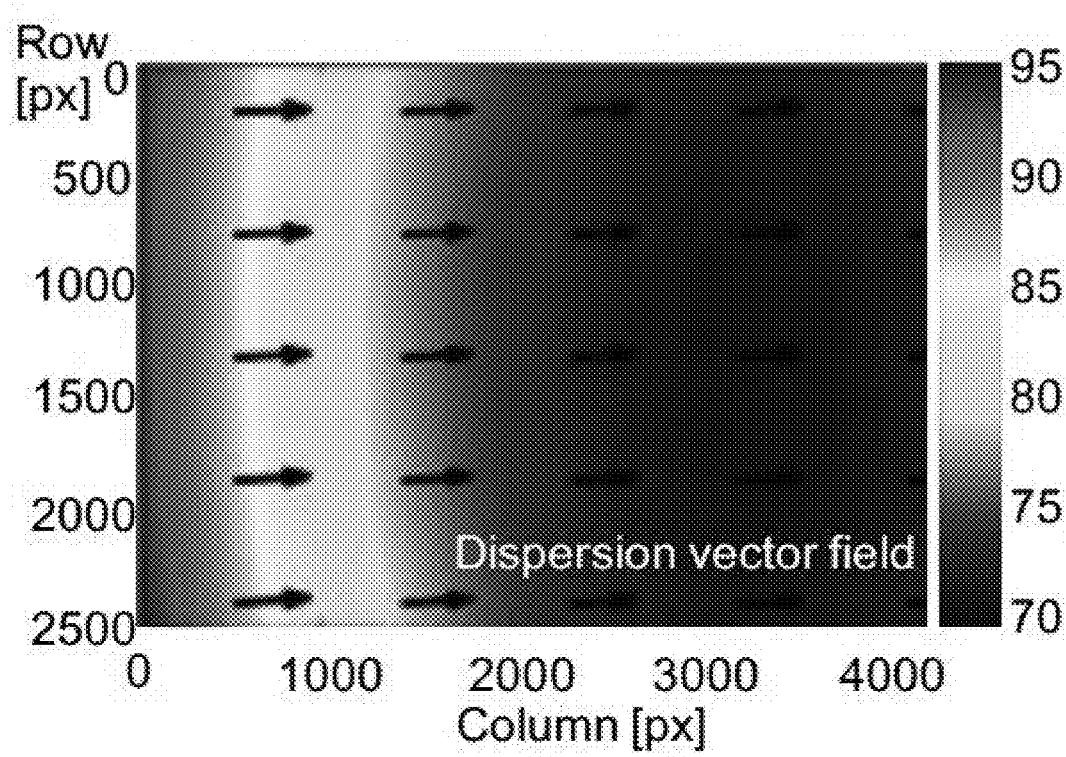
FIG. 6B is a drawing illustrating the resulting of a spatially-varying dispersion vector field.

FIG. 6A shows an example of per-wavelength changes in dispersion magnitude with varying depth. An embodiment of the inventive concept may measure the displacement from p700 nm to $p_\lambda$, at a center pixel. An embodiment of the inventive concept may observe that the magnitude of dispersion increases rapidly with depth z up to approximately 350 mm, then converges after approximately 700 mm. FIG. 6B shows the resulting of the spatially-varying dispersion vector field for all sensor pixels, with the image plane at z=700 mm, using Equation 5 above. The arrows indicate main directions of dispersion per pixel, while color codes indicate magnitude. Note that dispersion is more pronounced to the left due to the varying thickness of the prism. Other prisms, such as an Amici prism, may be used to mitigate the above-mentioned effect, that is, the effect that the dispersion is more pronounced to the left.

In practice, since a DSLR camera with an ordinary lens may capture information farther than 350 mm, an embodiment of the inventive concept may simplify the dispersion model removing its depth-dependency for larger distances. The resulting matrix Φ at z=700 mm may then be applied in general situations where the scene is at z>700 mm. This may be important, since it allows an embodiment of the inventive concept to reconstruct spectral information without the need for depth estimation.

3. Spectrum Reconstruction

Given an image formation model and a spatially-varying dispersion model according to an embodiment of the inventive concept, the embodiment of the inventive concept may describe how to reconstruct a hyperspectral image i from a dispersed RGB image j. The spectrum-to-RGB operator Ω and the dispersion model Φ for every pixel in Equation 2 above may be obtained from the calibration of the camera system.

Previous reconstruction methods, used in both CASSI and CTIS approaches, may rely on rich spectral cues that exist over all the input images. In CASSI, using a coded mask and collimation, dispersion patterns may be obtained independently of image structures. In CTIS, several dispersed images along different directions may be captured, in addition to a sharp image, at the cost of resolution loss.

Figure 7A:
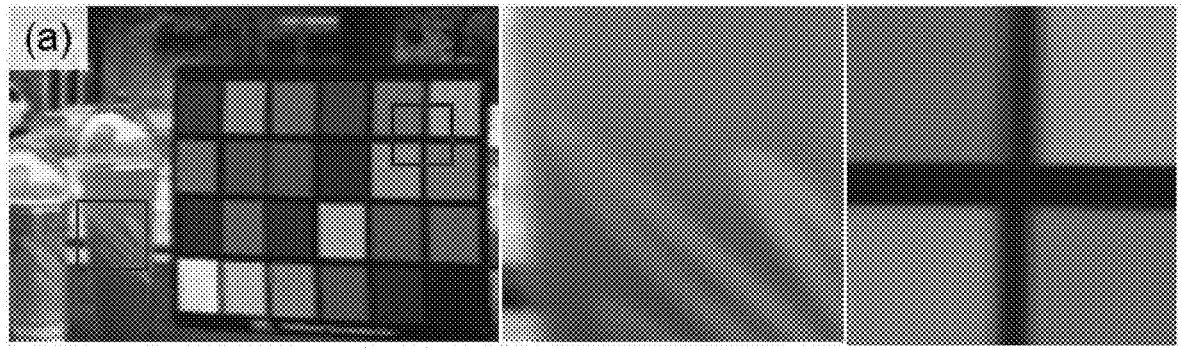
FIG. 7A is a drawing illustrating a raw RGB image.

Different from these systems, an embodiment of the inventive concept may only use a prism with a DSLR camera. As a result, an input may be a single RGB image with overlapping dispersion information, and, as shown in FIG. 7A, sparse spectral signatures may only be represented at the edges.

Thus, an embodiment of the inventive concept may present a novel reconstruction framework for compact single-shot hyperspectral imaging. Reconstruction according to an embodiment of the inventive concept may consist of three main stages. First, an edge restoration stage may align an input dispersed RGB image, in order to obtain clear edge information without dispersion or with reduced dispersion. Second, an embodiment of the inventive concept may estimate spectral information in the gradient domain using dispersion over the extracted edges. Last, an embodiment of the inventive concept may recover the hyperspectral image by using the sparse spectral information of gradients.

3.1 Restoring Edges from Dispersion

Restoring accurate edge information may be critical for a reconstruction algorithm, since edges are the main source to analyze dispersion. An embodiment of the inventive concept may estimate the spatially-aligned hyperspectral image $i_{aligned} \in \Re^{XY\Lambda \times 1}$ from an input dispersed RGB image j, by solving the following convex optimization problem. This may be represented as Equation 6 below.

$$i_{aligned} = \underset{i}{\mathrm{argmin}} \underbrace{\|\Omega\Phi i - j\|_2^2}_{\text{data term}} + \underbrace{\alpha_1\|\nabla_{xy} i\|_1 + \beta_1\|\nabla_\lambda \nabla_{xy} i\|_1}_{\text{prior terms}} \quad \text{[Equation 6]}$$

Herein, $\nabla_{xy}$ may be a spatial gradient operator, and $\nabla_\lambda$ may be a spectral gradient operator. Specifically, the first term ($\nabla_{xy}$) may describe the data residual of an image formation model, while the other terms ($\nabla_\lambda$) are priors.

The first prior may be a traditional total variation (TV) term, ensuring sparsity of spatial gradients and removal of spatial artifacts. An embodiment of the inventive concept may introduce a second prior, a modified cross-channel term, penalizing edge misalignment across spectral channels by pursuing sparseness in the change of spatial gradients.

While the original cross-channel prior of the conventional technique computes the difference between normalized gradient values for every pair of color channels, an embodiment of the inventive concept may compute the difference between unnormalized gradient values of adjacent spectral channels, assuming that spectral signals are locally smooth in adjacent channels. A cross-channel prior according to an embodiment of the inventive concept may thus enable the embodiment of the inventive concept to achieve spatial alignment between spectral channels. An embodiment of the inventive concept may solve Equation 6 above with the alternating direction method of multipliers (ADMM).

Figure 7B:
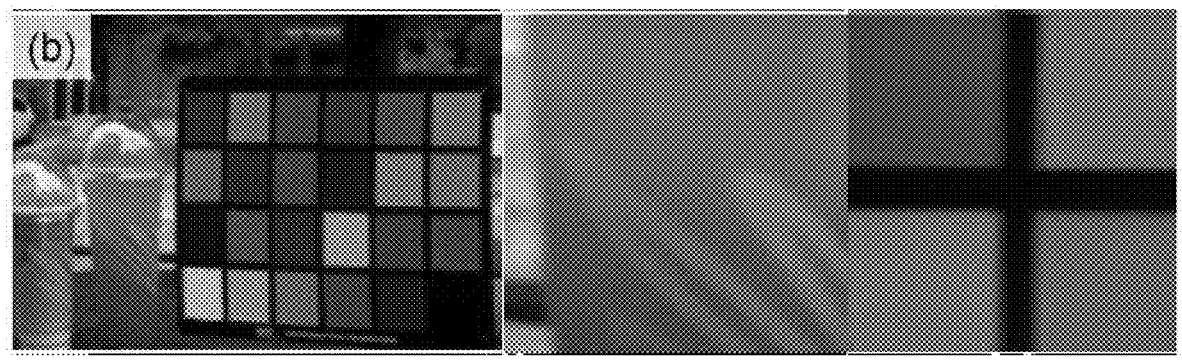
FIG. 7B is a drawing illustrating a recovered sRGB image with edge restoration.
Figure 7C:
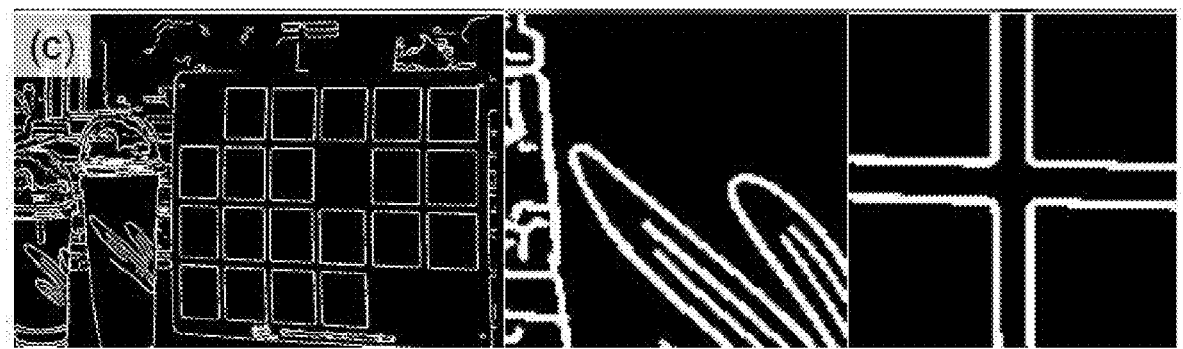
FIG. 7C is a drawing illustrating detected edges from the restored image without dispersion.

A spatial alignment stage may, as shown in FIG. 7B, yield a hyperspectral image without edge dispersion. However, the accuracy of the spectral information in $i_{aligned}$ may be still incomplete, and therefore unreliable. To accurately locate edges, instead of applying an edge detection algorithm directly on the aligned spectral channels in $i_{aligned}$, an embodiment of the inventive concept may first project the aligned spectral image $i_{aligned}$ onto RGB channels via the camera response functions $\Omega i_{aligned}$, then applying a multiscale edge detector. This may achieve more robust edge detection results, as shown in FIG. 7C. This extracted edge information will then be used to reconstruct spectral information from dispersion over edges in the next stage.

3.2 Reconstructing Spectral Information

The main insight of a spectral reconstruction algorithm may be based on the observation that dispersion over edges may be used as spectral reconstruction cues, as shown in (a) of FIG. 8, since it relates spectral information with spatial blur. In particular, an embodiment of the inventive concept may account for spatial gradients in the dispersed regions around edges to reconstruct a complete hyperspectral image. With a dispersed image with overlapping spectral information as input, as opposed to the rich per-pixel spectral information provided by a coded mask, the $|\Omega\Phi i - j|_2^2$ data term in Equation 6 above may be insufficient to reconstruct actual spectral intensities. Since the spatially-varying dispersion model Φ describes the relationship between spectral information and dispersed spatial information, an embodiment of the inventive concept may leverage spatial gradients of the dispersed image as input to reconstruct spectral intensity around edges.

Figure 8A:
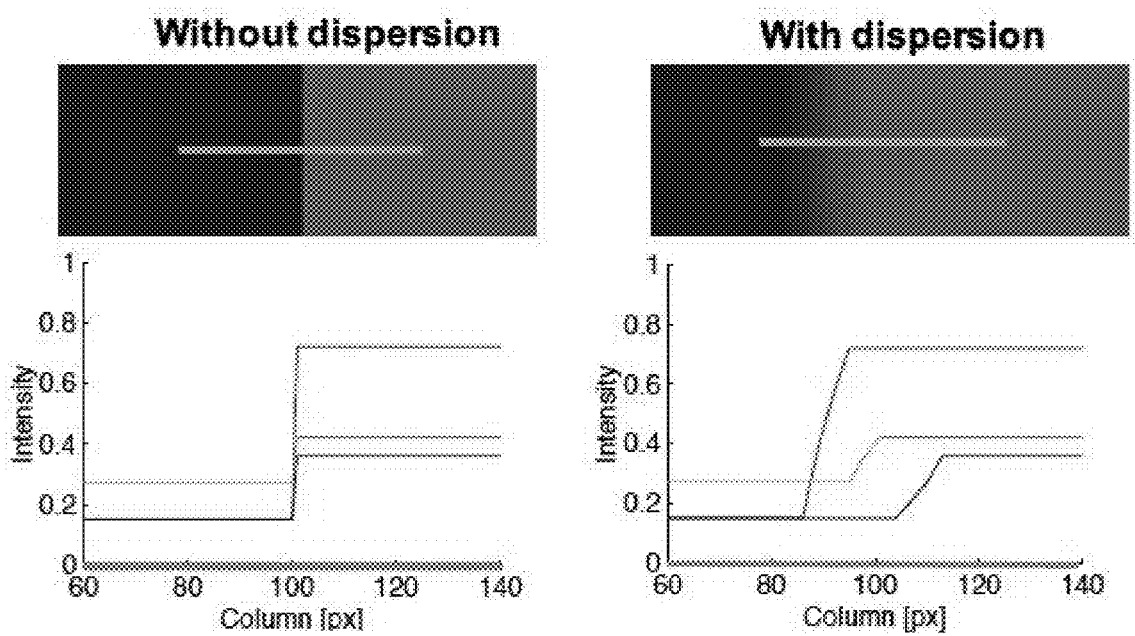
FIG. 8A is a drawing illustrating an image without dispersion at the left and the same image with dispersion at the right.
Figure 8B:
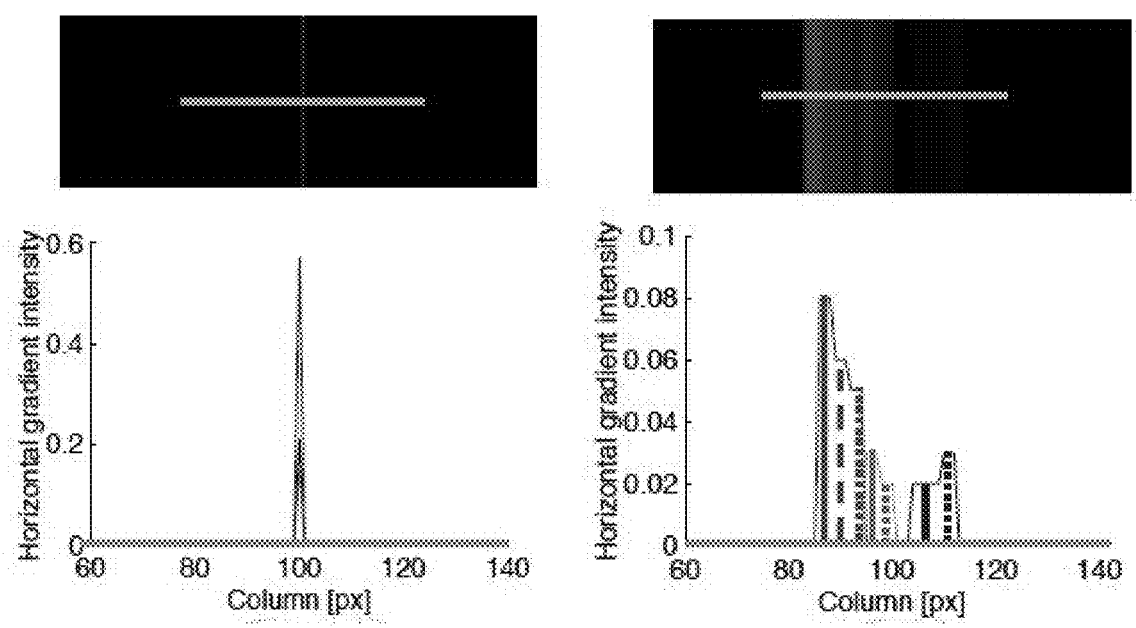
FIG. 8B is a drawing illustrating X-axis gradient images without and with dispersion.
Figure 8C:
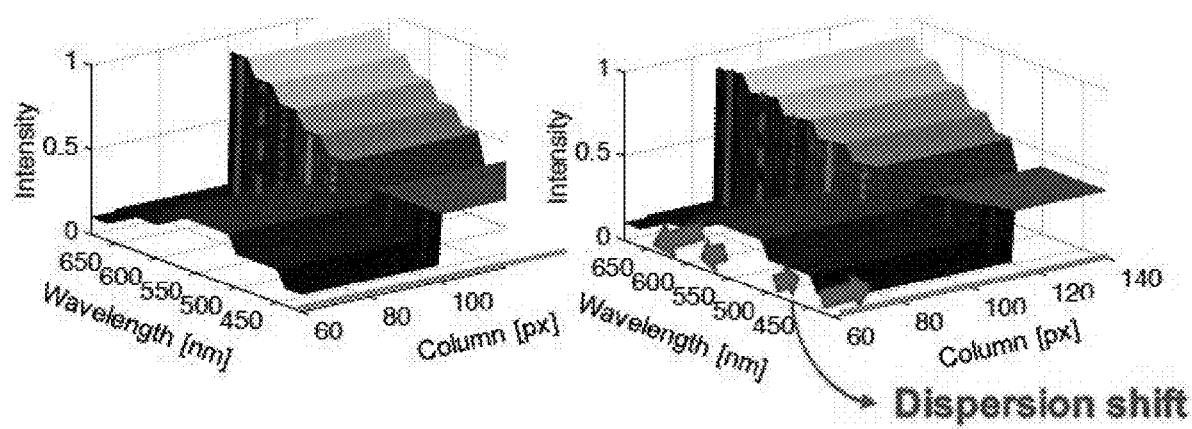
FIG. 8C is a drawing illustrating hyperspectral information around edges.

FIGS. 8A-8C illustrate an example. The left column of FIG. 8A shows pixel intensities, of FIG. 8B shows horizontal gradients, and of FIG. 8C shows hyperspectral representation, along a row in an image without dispersion (orange line). The right column of each FIG. 8A-8C presents the same information, but with dispersion through a prism. The spectral information in the dispersion-free image may be projected directly into RGB values, so an embodiment of the inventive concept may fail to trace back metameristic spectra from the given input. However, in the dispersed image, even though the spectral information appears as blur, its spatial gradients may reveal information about spectral power distributions along edges. As shown in the hyperspectral representation of FIG. 8C on the right column, different wavelengths may be sheared by a different magnitude and direction due to dispersion. Marginal projection of these dispersed spectra to RGB values along the wavelength axis may still leave cues for spectral reconstruction.

An embodiment of the inventive concept may clearly see the spectral cues in the gradient domain rather than the intensity domain. Each gradient profile of a pixel may contain the gradient information of a specific spectral channel depending on the dispersion predicted by the model Φ according to an embodiment of the inventive concept. This may motivate an embodiment of the inventive concept to formulate the reconstruction problem in the spatial gradient domain.

Gradient-Based Reconstruction

First, an embodiment of the inventive concept may estimate a stack of spatial gradients $\hat{g}_{xy}$ for each wavelength, by finding out the spatial gradients $g_{xy}$ that are close to the spatial gradients of the captured image $\nabla_{xy} j$, formulating the gradient reconstruction problem as Equation 7 below.

$$\hat{g} = \underset{g_{xy}}{\mathrm{argmin}} \underbrace{\|\Omega\Phi g_{xy} - \nabla_{xy} j\|_2^2}_{\text{data term}} + \underbrace{\alpha_2 \|\nabla_\lambda g_{xy}\|_1 + \beta_2 \|\nabla_{xy} g_{xy}\|_2^2}_{\text{prior terms}} \quad \text{[Equation 7]}$$

Herein, the first term may be a data term describing the image formation model in the gradient domain. The following two terms may be prior terms for gradients. The first prior term may be equivalent to the spectral sparsity of gradients used in the spatial alignment stage, enforcing sparse changes of gradients along the spectral dimension. The second prior term may impose smooth changes of gradients in the spatial domain, which reduces artifacts.

Figure 9A:
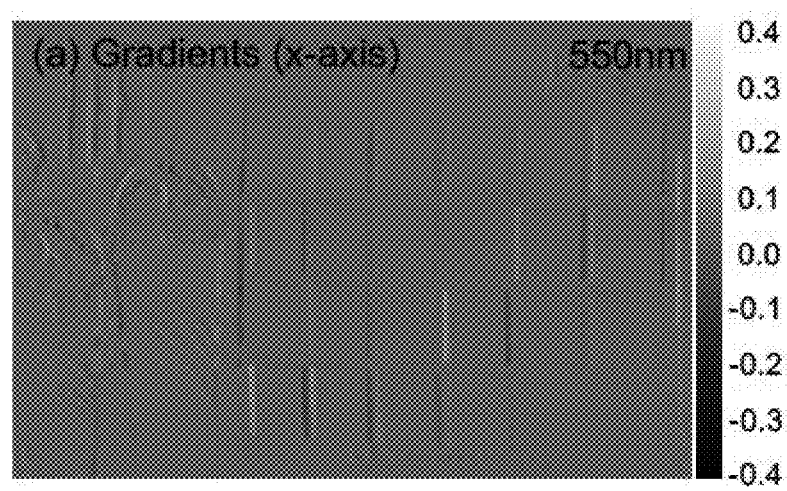
FIG. 9A is a drawing illustrating reconstructed horizontal gradients $g_x$ for a wavelength of 550 nm.

Given that the spectral signature exists over edges, an embodiment of the inventive concept may take into account edge pixels for the optimization in Equation 7 above. FIG. 9A shows the horizontal gradient image, the image being estimated for a wavelength of 550 nm extracted from the dispersion over edges.

Reconstructing the Spectral Image

After obtaining from dispersion a stack of spatial gradients $\hat{g}_{xy}$ for each wavelength, an embodiment of the inventive concept may utilize gradient information as strong spectral cues to reconstruct the hyperspectral image $i_{opt}$. Since an embodiment of the inventive concept does not have any known hyperspectral intensity, it may fail to directly apply Poisson reconstruction with boundary conditions. Instead, an embodiment of the inventive concept may formulate the following optimization problem as Equation 8 below to estimate $i_{opt}$ from $\hat{g}_{xy}$.

$$i_{opt} = \underset{i}{\mathrm{argmin}} \underbrace{\|\Omega\Phi i - j\|_2^2 + \alpha_3 \|W_{xy} \otimes (\nabla_{xy} i - \hat{g}_{xy})\|_2^2}_{\text{data terms}} + \underbrace{\beta_3 \|\nabla_\lambda i\|_2^2}_{\text{prior term}} \quad \text{[Equation 8]}$$

Herein, $\Delta_\lambda$ may be a Laplacian operator for the spectral image i along the spectral axis, and $W_{xy}$ may be an element-wise weighting matrix that determines the level of confidence of the estimated gradients in the previous step.

To take into account the directional dependency of spectral cues, an embodiment of the inventive concept may build the confidence matrix $W_{xy}$ based on the extracted edge information and the dispersion direction $n=[n_x, n_y]$. For non-edge pixels, an embodiment of the inventive concept may assign a high confidence for zero gradient values. For edge pixels, an embodiment of the inventive concept may assign different confidence levels for horizontal and vertical components respectively, so that gradient directions similar to the dispersion direction have a high confidence value. Specifically, a confidence value, $W_{k \in \{x,y\}}(p, \lambda)$, may be an element of the matrix $W_{xy}$ for the horizontal and vertical gradient components of a pixel p of wavelength $\lambda$, and may be represented as Equation 9 below.

$$W_{k \in \{x,y\}}(p, \lambda) = \begin{cases} |n_{k \in \{x,y\}}| & \text{if p is an edge pixel} \\ 1 & \text{otherwise} \end{cases} \quad \text{[Equation 9]}$$

Herein, $|\cdot|$ may denote absolute value.

The first data term may minimize errors in the image formation model. The second data term may minimize differences between the gradients $\nabla_{xy} i$ and the gradients $\hat{g}_{xy}$ from the previous stage. The prior term in Equation 8 above may favor spectral curvature smoothness $\|\Delta_\lambda i\|_2^2$. An embodiment of the inventive concept may fail to optimize any spectral gradients along the wavelength axis. Instead, an embodiment of the inventive concept may improve the stability of the spectral estimation by accounting for such curvature smoothness along the different wavelengths. Since Equation 8 above consists only of 12-norm terms, an embodiment of the inventive concept may solve it using a conjugate gradient method.

Detail-Guided Filtering

Figure 9B:
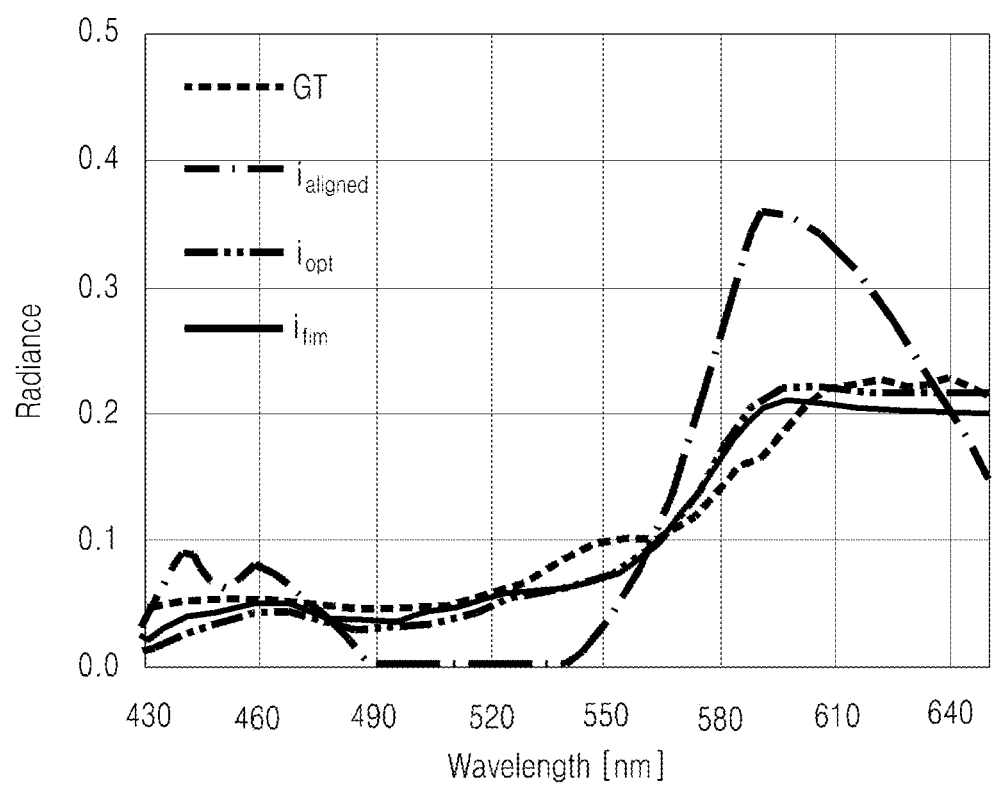
FIG. 9B is a drawing illustrating spectral power dispersions of the orange patch for each stage of a method according to an embodiment of the inventive concept.

While the solution from Equation 8 above yields high spectral accuracy, as shown in FIG. 9B, the lack of gradient information on smooth surfaces may lead to loss of spatial details. To restore these details, an embodiment of the inventive concept may apply a guided image filter for detail enhancement. It allows an embodiment of the inventive concept to enhance structural details of the aligned image $\Omega_{aligned}$ to each reconstructed hyperspectral channel, resulting in the detail-enhanced hyperspectral channel. As shown in FIG. 9C, this leads to the final reconstructed image $i_{fin}$, with high spectral and spatial accuracy.

4. Calibration

To reconstruct the spectral information from dispersion, an embodiment of the inventive concept may need to obtain the camera's intrinsic parameters, that is, its radiometric response function $\Omega$ (spectrum-to-RGB operator), and the spatially-varying dispersion matrix $\Phi$ of the prism. An embodiment of the inventive concept may calibrate the intrinsic properties of the camera, which include the focal length f, its optical center o, and distortion coefficients, using Zhang's method (a flexible new technique for camera calibration. IEEE Transactions on pattern analysis and machine intelligence 22, 11 (2000), 1330-1334). In the following, an embodiment of the inventive concept describes how to calibrate $\Omega$ and $\Phi$.

4.1 Radiometric Response of the Camera

Figure 10:
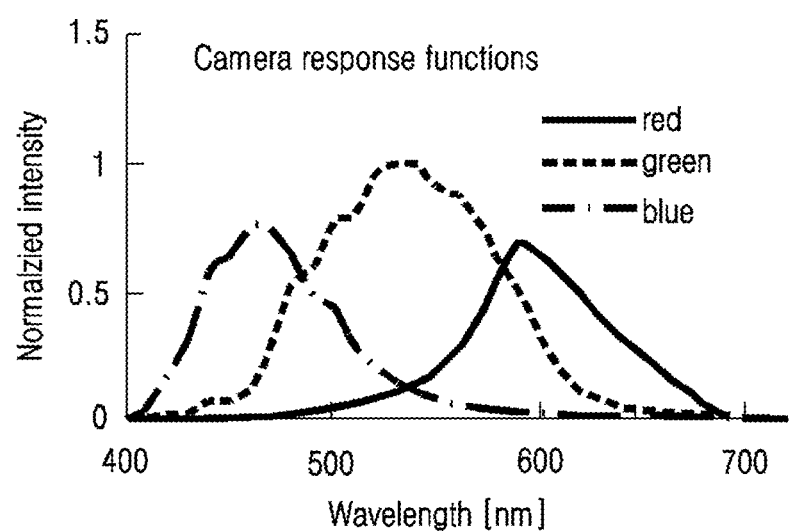
FIG. 10 is a drawing illustrating measured camera response functions.

To calibrate the spectral response functions of a camera's RGB channels, an embodiment of the inventive concept may illuminate a standard reflectance tile (Spectralon) with a solid-state plasma light. The reflected energy of each wavelength $R(\lambda)$ may then be measured by a spectroradiometer from 400 nm to 700 nm, in 10 nm intervals. At the same time, an embodiment of the inventive concept may capture band-wise spectral images filtered by an electronic bandpass filter (e.g., VariSpec VIS LCTF) using a DSLR camera (e.g., Canon EOS 5D Mark III) with a 50 mm lens. At the same time, to avoid under- or over-exposure, an embodiment of the inventive concept may capture raw images with five different exposures. As a result, as shown in an example shown in FIG. 10, an embodiment of the inventive concept may obtain the spectral response of the camera for each band, as a trichromatic response function $\Omega \in \mathfrak{R}^{3 \times \Lambda}$ in matrix form. Of course, if these calibration instruments are not available, an embodiment of the inventive concept may instead use publicly available datasets of the spectral sensitivity functions of other DSLR cameras.

4.2 Spatially-varying Dispersion of the Prism

This calibration may be based on the image formation model described above, and may consist of three steps: (a) obtaining the extrinsic position and orientation of the prism with respect to a camera; (b) obtaining the refraction model $\Psi$; and (c) obtaining the dispersion model $\Phi$.

Setup

Figure 11A:
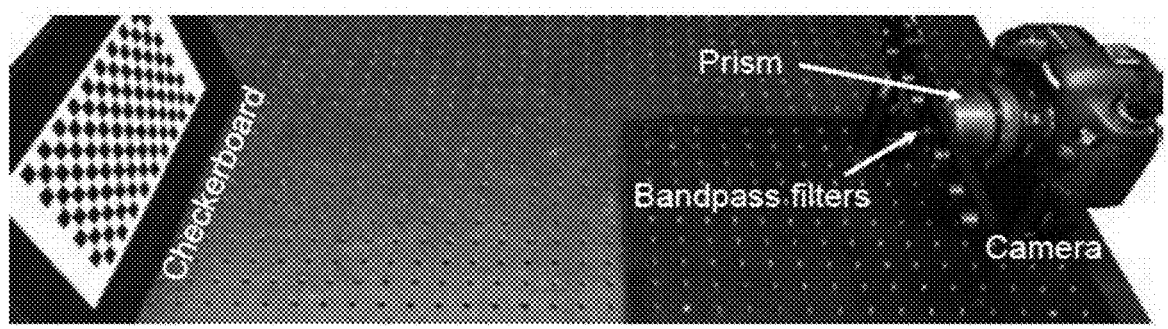
FIG. 11A is a drawing illustrating setup to estimate spatially-varying dispersion according to an embodiment of the inventive concept.
Figure 11B:
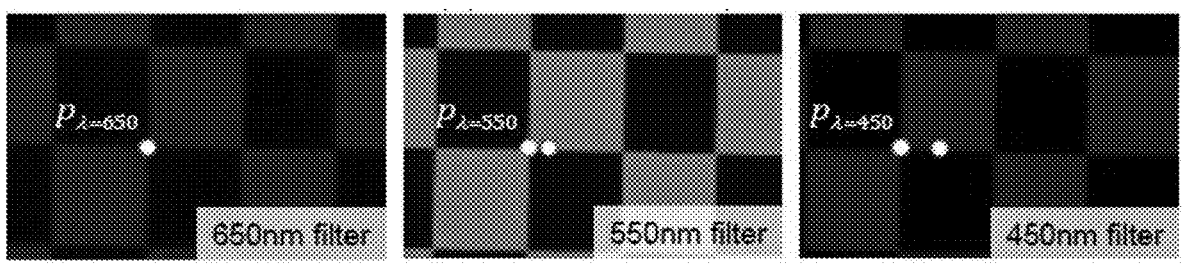
FIG. 11B is a drawing illustrating captured spectral images which present clear wavelength-dependent shifts.

FIG. 11A depicts the calibration setup according to an embodiment of the inventive concept. An embodiment of the inventive concept may insert a bandpass filter between a prism and a checkerboard target to isolate dispersion per wavelength. An embodiment of the inventive concept may use five 10 nm bandpass filters from 450 nm to 650 nm in 50 nm intervals. For each captured spectral image of wavelength $\lambda$, as shown in FIG. 11B, an embodiment of the inventive concept may obtain shifted positions $p_\lambda$ of the corner pixels in the checkerboard and corresponding direct ray positions $p_d$ without the prism at a known distance z.

The camera calibration method may yield not only the intrinsic camera matrix, but also three-dimensional (3D) coordinates of feature points at corners. In the end, an embodiment of the inventive concept may use positions $p_\lambda$ and $p_d$ and depth z of each checkerboard corner for prism calibration.

Prism Parameters

An embodiment of the inventive concept may use an Edmund Littrow dispersion prism made of N-BK7 with 30-60-90 angles to disperse light.

Figure 12A:
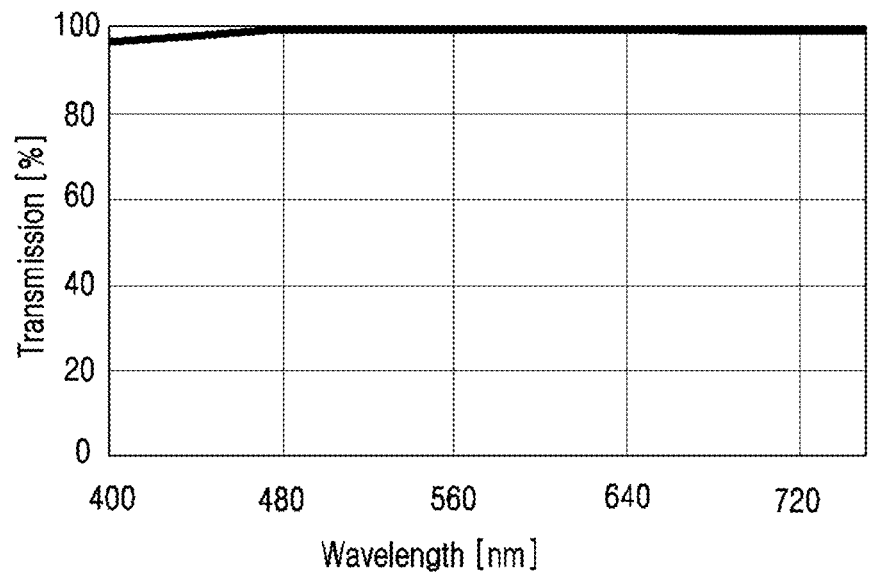
FIGS. 12A and 12B are drawings illustrating light transmission and refractive indices per wavelength.
Figure 12B:
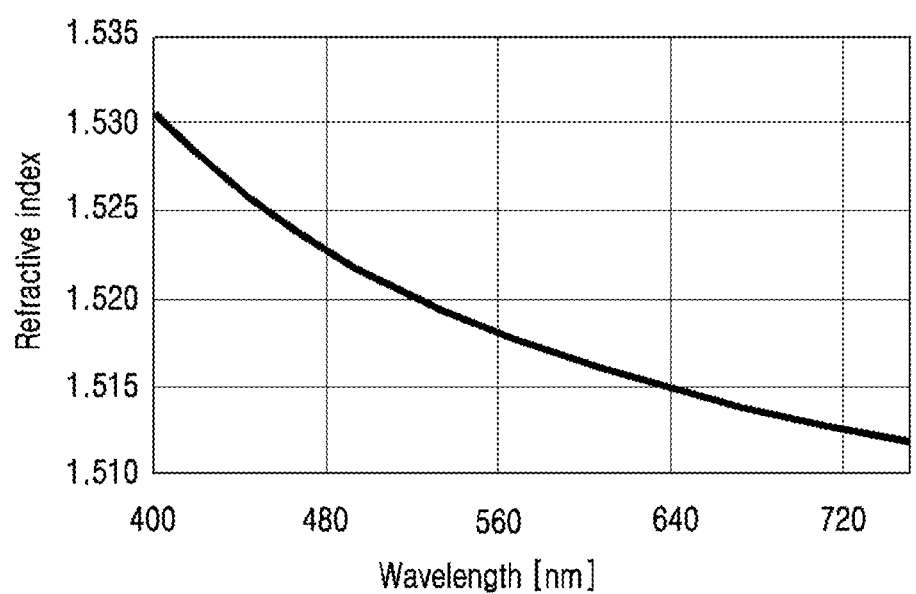

FIGS. 12A and 12B show its transmission and refractive indices per wavelength. In addition to these intrinsic parameters, an embodiment of the inventive concept may define its extrinsic parameters (position and orientation) as a six-dimensional vector that includes the parameters, $s_x$, $s_y$, $s_z$, $v_x$, $v_y$, and $v_z$ in Equation 3 above. Therefore, an embodiment of the inventive concept may rewrite the refraction function in Equation 4 above as $p_d = \Psi_\lambda(p_\lambda, z; \xi)$. Using the refraction function $\Psi_\lambda$ and the captured positions $p_\lambda$ and $p_d$ and depth z, an embodiment of the inventive concept may estimate $\xi$ by nonlinear optimization of the following objective function and may represent the estimated $\xi$ as Equation 10 below.

$$\min_\xi \sum_{\lambda \in \Gamma} \sum_{\{p_\lambda, p_d\} \in \Pi_\lambda} \|p_d - \Psi_\lambda(p_\lambda, z; \xi)\|_2^2 \quad \text{[Equation 10]}$$

Herein, $\Gamma$ may be a subset of the wavelengths (450 nm, 500 nm, 550 nm, 600 nm, and 650 nm) used for calibration in the experiment, and $\pi_\lambda$ may be a set of corresponding pairs $p_\lambda$ and $p_d$ at a depth z. This may yield highly accurate prism parameters. The average reprojection error from $p_\lambda$ to $p_d$ may be ~0.51 pixel in the implementation of the inventive concept.

Refraction Model

Figure 13A:
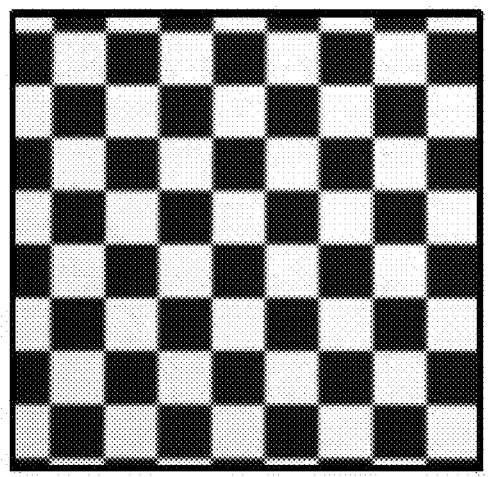
FIG. 13A is a drawing illustrating a checkerboard captured without the prism.
Figure 13B:
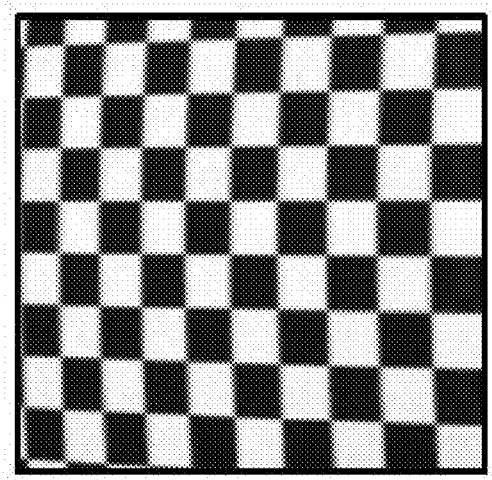
FIG. 13B is a drawing illustrating a checkerboard captured with the prism, resulting in geometric distortion.
Figure 13C:
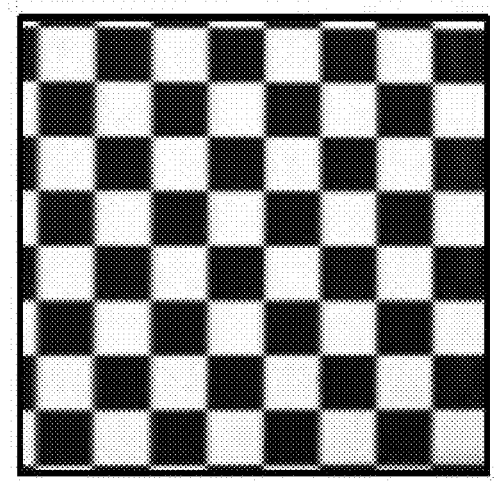
FIG. 13C is a drawing illustrating a distortion-corrected checkerboard using a refraction model according to an embodiment of the inventive concept.

Once an embodiment of the inventive concept knows the prism parameters $\xi$ and the refraction function $\Psi_\lambda$, it may build a refraction model $\Psi$ in matrix form, describing per-pixel relations between a refracted pixel $p_\lambda$ and its corresponding direct-ray pixel $p_d$, per wavelength. The refraction model $\Psi$ may allow an embodiment of the inventive concept not only to calculate the dispersion model $\Phi$ for every pixel, as shown in FIG. 13C, but also to correct geometric distortions caused by refraction. FIG. 13A shows the captured checkerboard without a prism. Once an embodiment of the inventive concept has a prism in front of the camera, refraction through the prism may introduce geometric distortion in addition to dispersion, as shown in FIG. 13B. An embodiment of the inventive concept may correct this geometric distortion using the refraction model $\Psi$. The refraction model $\Psi$ may warp the captured refracted image into a direct-ray image (without the prism). An embodiment of the inventive concept may use an inverse mapping of the refraction model in order to avoid holes similar to inverse texture mapping.

Dispersion Model

An embodiment of the inventive concept may define the dispersion function $\Phi_\lambda$ using the refraction function $\Psi_\lambda$. Therefore, once an embodiment of the inventive concept has the obtained refraction model $\Psi$, it may compute a dispersion model $\Phi$ for every pixel. An embodiment of the inventive concept may warp a pixel $p_{\lambda_{ref}}$ to a pixel $p_d$ via the refraction model $\Psi$, then warping the pixel $p_d$ to a pixel $p_\lambda$ via its inverse model $\Psi^{-1}$. The dispersion model $\Phi$ then relates a pixel $p_{\lambda_{ref}}$ to a pixel $p_\lambda$.

As such, the method according to an embodiment of the inventive concept may reconstruct hyperspectral images using only a conventional camera and prism, configuring a hyperspectral image reconstruction system with high portability and at a low cost.

Moreover, an embodiment of the inventive concept may reconstruct hyperspectral images using only a prism and a camera without a coded aperture or complex collimating optics by making a detailed analysis of a path of light incident from a camera through a prism and estimating hyperspectral information through spectral information on a captured picture.

Furthermore, an embodiment of the inventive concept may capture an image with continuous dispersion with a single shot, resulting in higher spectral resolution without severely sacrificing spatial resolution.

Furthermore, an embodiment of the inventive concept may reconstruct hyperspectral images using only a camera and a prism, excluding a coded aperture, resulting in the low cost of configuring the system.

In addition, the method according to embodiments of the inventive concept may generate a refraction function for the relationship between a direct ray and refraction through the prism and may generate a dispersion model for dispersion created by the prism based on the generated refraction function, thus reconstructing hyperspectral images corresponding to a captured image based on the generated dispersion model. Of course, the method of reconstructing hyperspectral images using the refraction function for the relationship between the direct ray and the refraction through the prism may be applied, irrespective of whether a coded aperture is included.

The method according to an embodiment of the inventive concept may be configured as a device or system. The configured device or system may include all the functions of the method according to an embodiment of the inventive concept.

The foregoing systems or devices may be realized by hardware components, software components, and/or combinations thereof. For example, the systems, the devices, and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to embodiments may be implemented with program instructions which may be executed through various computer means and may be recorded in computer-readable media. The media may also include, alone or in combination with the program instructions, data files, data structures, and the like. The program instructions recorded in the media may be designed and configured specially for an embodiments or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of embodiments, or vice versa.

According to embodiments of the inventive concept, the system may reconstruct hyperspectral images using only a conventional camera and prism and may configure a hyperspectral image reconstruction system with high portability and at a low cost.

In detail, embodiments of the inventive concept may reconstruct hyperspectral images using only a prism and a camera without a coded aperture or complex collimating optics by making a detailed analysis of a path of light incident from a camera through a prism and estimating hyperspectral information through spectral information on a captured picture.

According to embodiments of the inventive concept, the system may capture an image with continuous dispersion with a single shot, resulting in higher spectral resolution without severely sacrificing spatial resolution.

According to embodiments of the inventive concept, the system may have the existing camera equipped with a prism and may use the prism for various purposes such as plant classification, ore classification, and digitalization of real objects.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A method for reconstructing a hyperspectral image, the method comprising:
    obtaining a dispersion model for dispersion created by a prism included in a camera, the prism including no coded aperture;
    aligning an input dispersed captured image to obtain edge information without dispersion, wherein the obtaining of the edge information comprises:
        computing a difference between unnormalized gradient values of adjacent spectral channels in the captured image;
        performing spatial alignment between spectral channels;
        projecting an aligned spectral image onto RGB channels via a response function of the camera; and
        obtaining the edge information using an edge detector;
    estimating spectral information based on the obtained edge information and the dispersion model; and
    reconstructing a hyperspectral image corresponding to a captured image based on the dispersion model and the estimated spectral information.

2. The method of claim 1, wherein the obtaining of the dispersion model comprises:
    generating a refraction function for each wavelength, the refraction function predicting each pixel's wavelength-dependent refractive shift; and
    obtaining the dispersion model for the magnitude and direction of dispersion in the captured image based on the generated refraction function.

3. The method of claim 2, wherein the generating of the refraction function comprises:
    generating the refraction function describing a relation between a first position at which a direct ray reaches a sensor of the camera and a second position at which the direct ray is projected on the sensor by refraction through the prism, with respect to each pixel.

4. The method of claim 3, wherein the obtaining of the dispersion model comprises:
    selecting a reference wavelength and obtaining the first position corresponding to a reference position and depth at which the direct ray is projected on the sensor in response to the reference wavelength using the refraction function;
    computing an inverse refraction function mapping from the first position to the second position, for predetermined wavelengths; and
    obtaining the dispersion model which encodes the magnitude and direction of dispersion of the captured image using the first position, corresponding to the reference position and depth, and the inverse refraction function.

5. The method of claim 1, further comprising:
calibrating a radiometric response of the camera and the dispersion model,
wherein the reconstructing of the hyperspectral image comprises:
reconstructing the hyperspectral image corresponding to the captured image based on the calibrated radiometric response and the calibrated dispersion model.

6. A camera device, comprising:
a processor performing operations of a first obtaining unit configured to obtain a dispersion model for dispersion created by a prism included in a camera, the prism including no coded aperture;
a second obtaining unit configured to align an input dispersed captured image to obtain edge information without dispersion, wherein the second obtaining unit is configured to:
compute a difference between unnormalized gradient values of adjacent spectral channels in the captured image;
perform spatial alignment between spectral channels;
project an aligned spectral image onto RGB channels via a response function of the camera; and
obtain the edge information using an edge detector;
an estimation unit configured to estimate spectral information based on the obtained edge information and the dispersion model; and
a reconstruction unit configured to reconstruct a hyperspectral image corresponding to a captured image based on the dispersion model and the estimated spectral information.

7. The camera device of claim 6, wherein the first obtaining unit is configured to:
generate a refraction function for each wavelength, the refraction function predicting each pixel's wavelength-dependent refractive shift; and
obtain the dispersion model for the magnitude and direction of dispersion in the captured image based on the generated refraction function.

8. The camera device of claim 7, wherein the first obtaining unit is configured to:
generate the refraction function describing a relation between a first position at which a direct ray reaches a sensor of the camera and a second position at which the direct ray is projected on the sensor by refraction through the prism, with respect to each pixel.

9. The camera device of claim 8, wherein the first obtaining unit is configured to:
select a reference wavelength and obtain the first position corresponding to a reference position and depth at which the direct ray is projected on the sensor in response to the reference wavelength using the refraction function;
compute an inverse refraction function mapping from the first position to the second position, for predetermined wavelengths; and
obtain the dispersion model which encodes the magnitude and direction of dispersion of the captured image using the first position, corresponding to the reference position and depth, and the inverse refraction function.

10. The camera device of claim 6, further comprising:
the processor performing operations of a calibration unit configured to calibrate a radiometric response of the camera and the dispersion model,
wherein the reconstruction unit is configured to:
reconstruct the hyperspectral image corresponding to the captured image based on the calibrated radiometric response and the calibrated dispersion model.

* * * * *